US010602555B2

United States Patent
Lee et al.

(10) Patent No.: US 10,602,555 B2
(45) Date of Patent: Mar. 24, 2020

(54) METHOD FOR ESTABLISHING LAYER-2 ENTITIES FOR D2D COMMUNICATION SYSTEM AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 29 days.

(21) Appl. No.: 15/128,280

(22) PCT Filed: Apr. 15, 2015

(86) PCT No.: PCT/KR2015/003779
§ 371 (c)(1),
(2) Date: Jul. 5, 2018

(87) PCT Pub. No.: WO2015/163639
PCT Pub. Date: Oct. 29, 2015

(65) Prior Publication Data
US 2018/0343692 A1    Nov. 29, 2018

Related U.S. Application Data

(60) Provisional application No. 61/983,458, filed on Apr. 24, 2014.

(51) Int. Cl.
*H04W 76/14*     (2018.01)
*H04W 92/18*     (2009.01)
(Continued)

(52) U.S. Cl.
CPC ....... *H04W 76/14* (2018.02); *H04L 29/08306* (2013.01); *H04L 67/104* (2013.01);
(Continued)

(58) Field of Classification Search
CPC ..... H04W 76/14; H04W 80/02; H04W 9/218; H04W 8/26; H04W 36/0022
See application file for complete search history.

(56) References Cited

U.S. PATENT DOCUMENTS

| | | | |
|---|---|---|---|
| 6,687,817 B1 | 2/2004 | Paul | |
| 2010/0091723 A1* | 4/2010 | Park | H01J 1/304 370/329 |

(Continued)

FOREIGN PATENT DOCUMENTS

| | | |
|---|---|---|
| CN | 1780481 A | 5/2006 |
| WO | 2013149665 A1 | 10/2013 |
| WO | 2013191353 A1 | 12/2013 |

OTHER PUBLICATIONS

"LTE; Evolved Universal Terrestrial Radio Access (E-UTRA); Packet Data Convergence Protocol (PDCP) specification (3GPP TS 36.323 version 11.2.0 Release 11)", ETSI TS 136 323 V11.2.0 (Apr. 2013).

*Primary Examiner* — Anez C Ebrahim
(74) *Attorney, Agent, or Firm* — Dentons US LLP

(57) ABSTRACT

The present invention relates to a wireless communication system. More specifically, the present invention relates to a method and a device for establishing layer-2 entities for D2D communication system, the method comprising: configuring a sidelink radio bearer over which the UE transmits data to a peer UE; establishing RLC (Radio Link Control) and PDCP (Packet Data Convergence Protocol) entities for the sidelink radio bearer by selecting one of configuration information sets, wherein each configuration information set is identified by each configuration information index; and transmitting configuration information of the sidelink radio bearer via a sidelink to the peer UE, wherein the UE is directly connected to the peer UE via the sidelink.

9 Claims, 15 Drawing Sheets

(51) Int. Cl.
*H04W 80/02* (2009.01)
*H04L 29/08* (2006.01)
*H04W 76/38* (2018.01)
*H04W 76/11* (2018.01)
*H04W 76/32* (2018.01)
*H04W 28/02* (2009.01)
*H04W 28/06* (2009.01)
*H04W 84/18* (2009.01)

(52) U.S. Cl.
CPC ....... *H04W 28/0278* (2013.01); *H04W 28/06* (2013.01); *H04W 76/11* (2018.02); *H04W 76/32* (2018.02); *H04W 76/38* (2018.02); *H04W 80/02* (2013.01); *H04W 84/18* (2013.01); *H04W 92/18* (2013.01)

(56) References Cited

U.S. PATENT DOCUMENTS

| | | |
|---|---|---|
| 2010/0153804 A1 | 6/2010 | Cai et al. |
| 2010/0165937 A1 | 7/2010 | Yi et al. |
| 2013/0003688 A1 | 1/2013 | Wu |
| 2013/0324114 A1 | 12/2013 | Raghothaman et al. |
| 2014/0328329 A1 | 11/2014 | Novlan et al. |
| 2016/0277922 A1* | 9/2016 | Gunnarsson ............ H04W 8/26 |
| 2016/0374139 A1 | 12/2016 | Chen et al. |
| 2017/0013639 A1 | 1/2017 | Ma et al. |
| 2017/0013640 A1 | 1/2017 | Loehr et al. |
| 2017/0171837 A1 | 6/2017 | Chen et al. |

\* cited by examiner (a) Control-Plane Protocol Stack (b) User-Plane Protocol Stack

METHOD FOR ESTABLISHING LAYER-2 ENTITIES FOR D2D COMMUNICATION SYSTEM AND DEVICE THEREFOR

This is application is a National Stage Entry of International Application No. PCT/KR2015/003799 filed Apr. 15, 2015, which claims priority to U.S. Provisional Application No. 61/983,458 filed Apr. 24, 2014, each of which are incorporated by reference for all purposes as if fully set forth herein.

TECHNICAL FIELD

The present invention relates to a wireless communication system and, more particularly, to a method establishing layer-2 entities for D2D (Device to Device) communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE

Technical Problem

An object of the present invention devised to solve the problem lies in a method and device for establishing layer-2 entities (e.g. RLC entity or PDCP entity) for D2D communication system. The technical problems solved by the present invention are not limited to the above technical problems and those skilled in the art may understand other technical problems from the following description.

Technical Solution

The object of the present invention can be achieved by providing a method for a User Equipment (UE) operating in a wireless communication system, the method comprising: configuring a sidelink radio bearer over which the UE transmits data to a peer UE; establishing RLC (Radio Link Control) and PDCP (Packet Data Convergence Protocol) entities for the sidelink radio bearer by selecting one of configuration information sets, wherein each configuration information set is identified by each configuration information index; and transmitting an index of the selected configuration information set via a sidelink to the peer UE, wherein the UE is directly connected to the peer UE via the sidelink.

Preferably, the method further comprises: configuring, by the UE, mapping relation between configuration information sets and indices; and transmitting the mapping relation to the peer UE.

Preferably, the method further comprises: receiving, by the UE, mapping relation between configuration information sets and indices from a network Preferably, wherein LCID is used for the configuration information index, wherein the LCID is an identifier of a logical channel of the sidelink radio bearer.

Preferably, the index of the selected configuration information set is transmitted one or multiple times to the peer UE, wherein a transmission number of the index is configured by the network or pre-defined.

Preferably, the index of the selected configuration information set is transmitted periodically to the peer UE, wherein periodicity of transmitting the index is configured by the network or pre-defined.

Preferably, the index of the selected configuration information set is transmitted as form of at least one of RRC (Radio Resource Control), PDCP (Packet Data Convergence Protocol), RLC (Radio Link Control), MAC (Medium Access Control), or PHY (PHYsical layer) signal.

Preferably, the index of the selected configuration information set is transmitted via a first D2D (Device to Device) packet, wherein the first D2D packet is transmitted before transmitting any other D2D packets of the sidelink radio bearer to the peer UE.

Preferably, the first D2D packet further includes at least one of a target ID, a source ID or a LCID.

In another aspect of the present invention, provided herein is a method for a User Equipment (UE) operating in a wireless communication system, the method comprising: receiving an index of a configuration information set via a sidelink from the peer UE, wherein the UE is directly connected to the peer UE via the sidelink and, wherein the configuration information set corresponds to a sidelink radio bearer to be configured; configuring the sidelink radio bearer according to the configuration information set indicated by the index; and establishing RLC (Radio Link Control) and PDCP (Packet Data Convergence Protocol) entities for the sidelink radio bearer if the RLC and PDCP entities are not established yet.

Preferably, the method further comprises: receiving, by the UE, mapping relation between configuration information sets and indices from the peer UE or a network.

Preferably, LCID is used for the configuration information index, wherein the LCID is an identifier of a logical channel of the sidelink radio bearer. And one or more LCIDs are associated with one configuration information set.

Preferably, each configuration information set includes at least one of parameters including a PDCP-SN-Size, a headerCompression, a SN-FieldLength and a T-Reordering.

Preferably, the index of the configuration information set is received via a first D2D (Device to Device) packet, wherein the first D2D packet is received before receiving any other D2D packets of the sidelink radio bearer from the peer UE.

Preferably, the first D2D packet further includes at least one of a target ID, a source ID or a LCID.

Preferably, the method further comprises: delivering wherein the index of the configuration information set to the established RLC and PDCP entities.

Preferably, the method further comprises: ignoring the received the index of the configuration information set if the RLC and PDCP entities are already established.

Preferably, the method further comprises: updating the RLC and PDCP entities for the sidelink associated with a targetID, a sourceID, and a LCID by setting the PDCP-SN-Size, the headerCompression, the SN-FieldLength, and the T-Reordering to the values in the configuration information set indicated by the index.

It is to be understood that both the foregoing general description and the following detailed description of the present invention are exemplary and explanatory and are intended to provide further explanation of the invention as claimed.

Advantageous Effects

According to the present invention, an RLC entity and a PDCP entity can be efficiently established in D2D communication system. It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
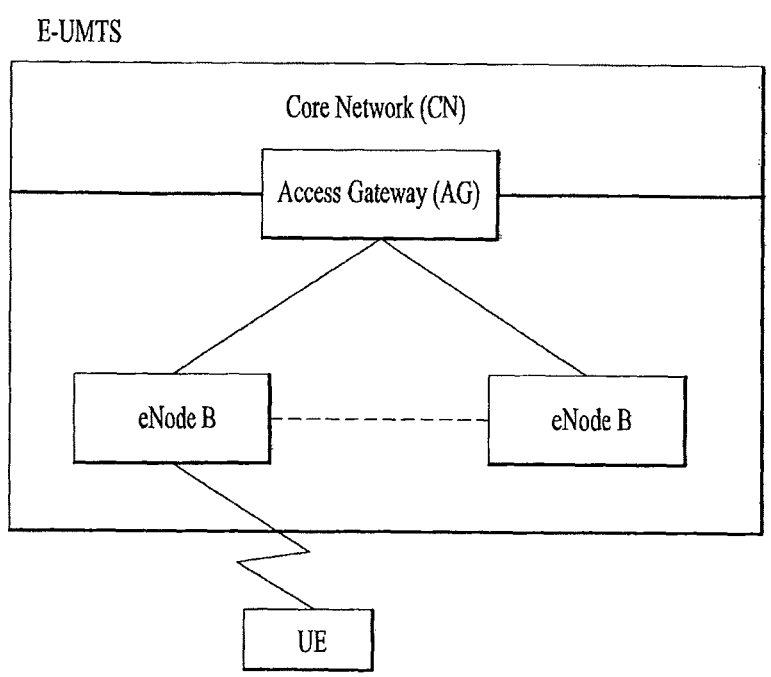
FIG. 1 is a diagram showing a network structure of an Evolved Universal Mobile Telecommunications System (E-UMTS) as an example of a wireless communication system.
Figure 2A:
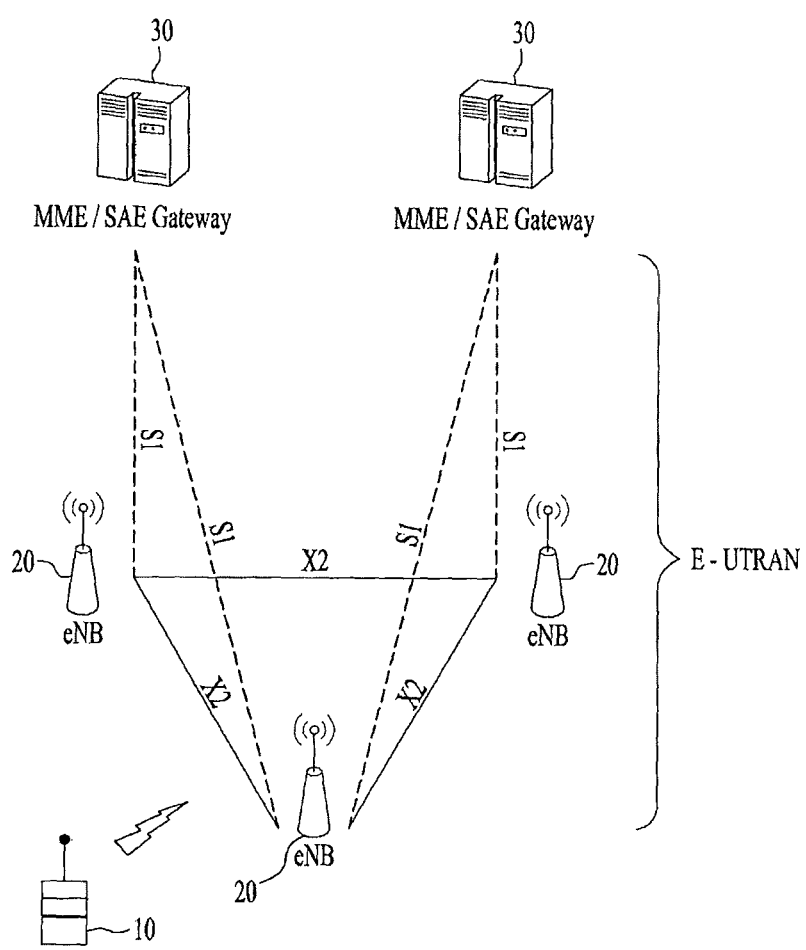
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
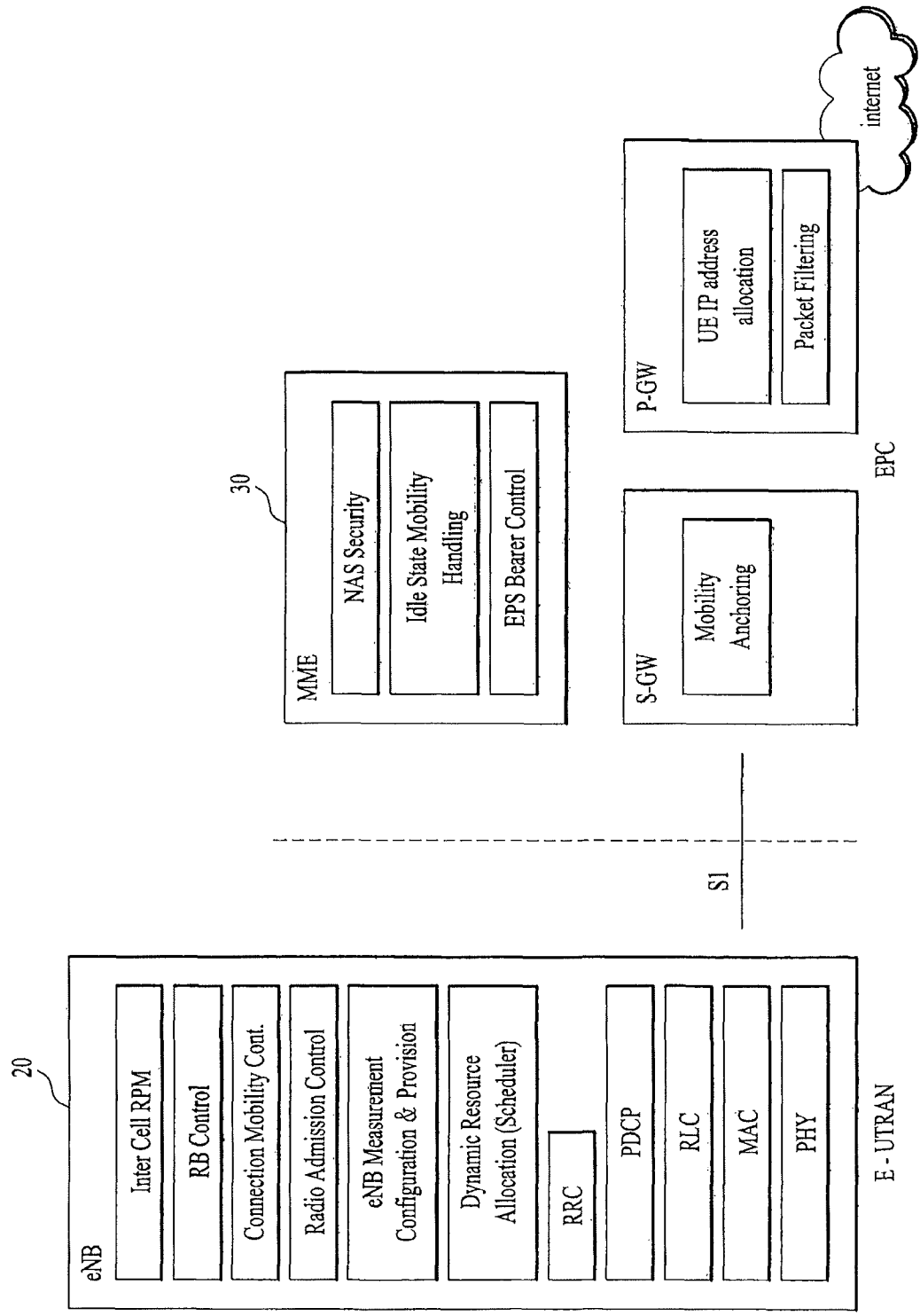
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
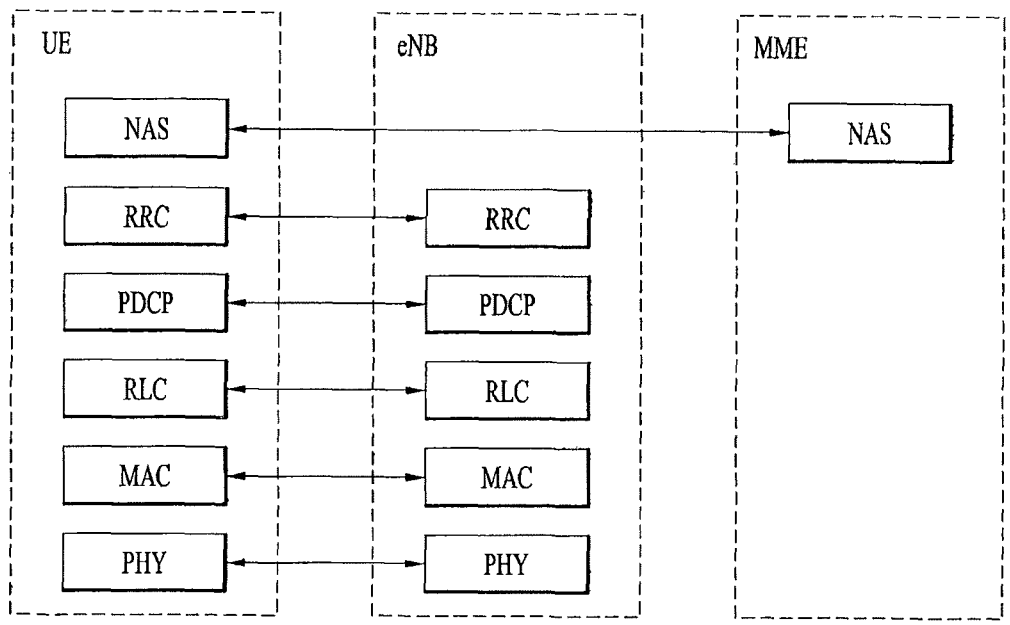
FIG. 3 is a diagram showing a control plane and a user plane of a radio interface protocol between a UE and an E-UTRAN based on a 3rd generation partnership project (3GPP) radio access network standard.
Figure 3:
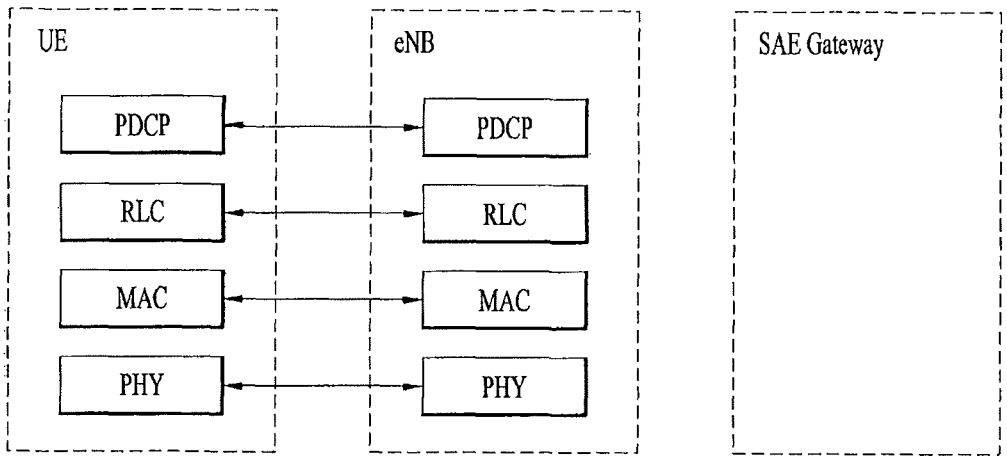

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
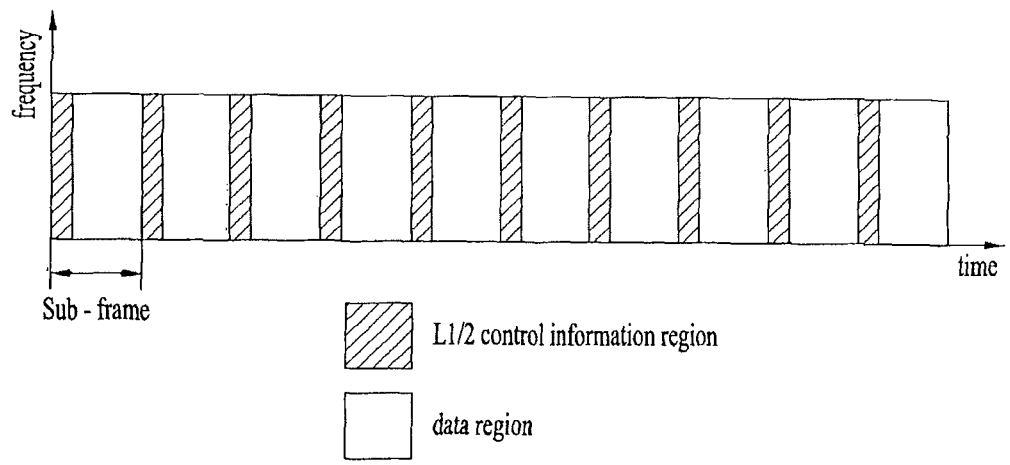
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PD-CCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
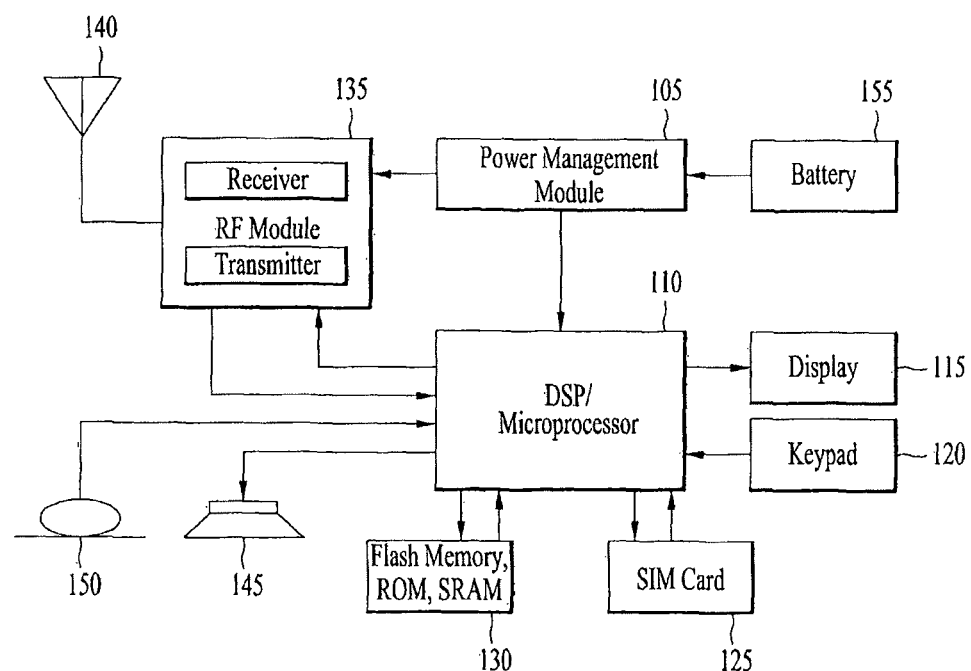
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

Figure 6:
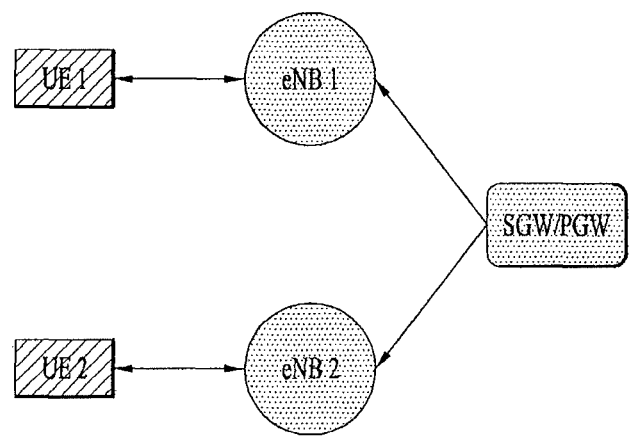
FIG. 6 is an example of default data path for a normal communication.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 7:
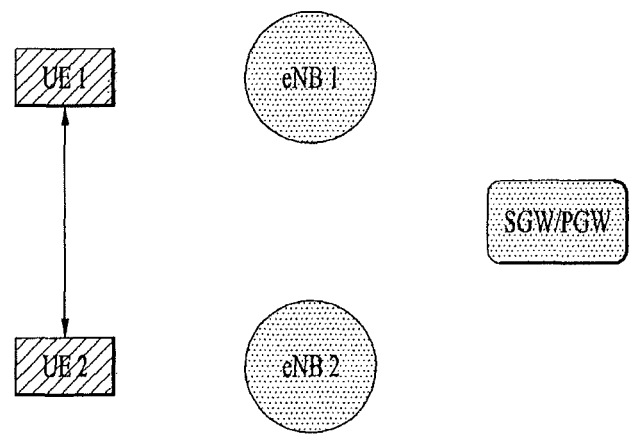
FIGS. 7-8 are examples of data path scenarios for a proximity communication.
Figure 8:
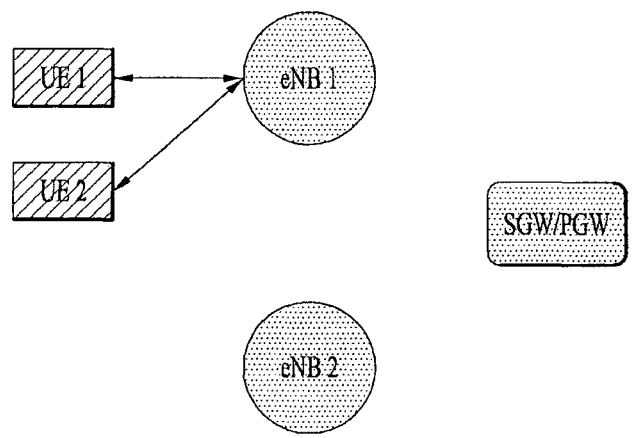

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Figure 9:
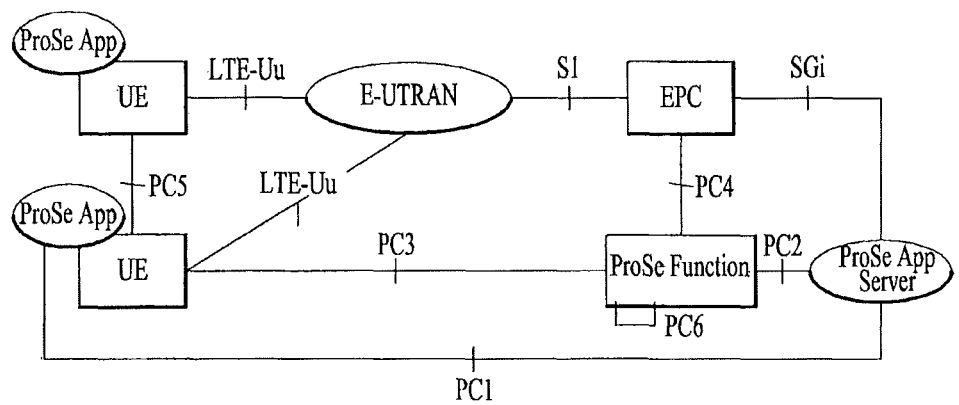
FIG. 9 is a conceptual diagram illustrating for a non-roaming reference architecture.

FIG. 9 is a conceptual diagram illustrating for a non-roaming reference architecture.

PC1 to PC 5 represent interfaces. PC1 is a reference point between a ProSe application in a UE and a ProSe App server. It is used to define application level signaling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:
Interworking via a reference point towards the 3rd party Applications
Authorization and configuration of the UE for discovery and Direct communication
Enable the functionality of the EPC level ProSe discovery
ProSe related new subscriber data and/handling of data storage; also handling of ProSe identities;
Security related functionality
Provide Control towards the EPC for policy related functionality
Provide functionality for charging (via or outside of EPC, e.g. offline charging)

Especially, the following identities are used for ProSe Direct Communication:
Source Layer-2 ID identifies a sender of a D2D packet at PC5 interface. The Source Layer-2 ID is used for identification of the receiver RLC UM entity;
Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and
SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

Figure 10:
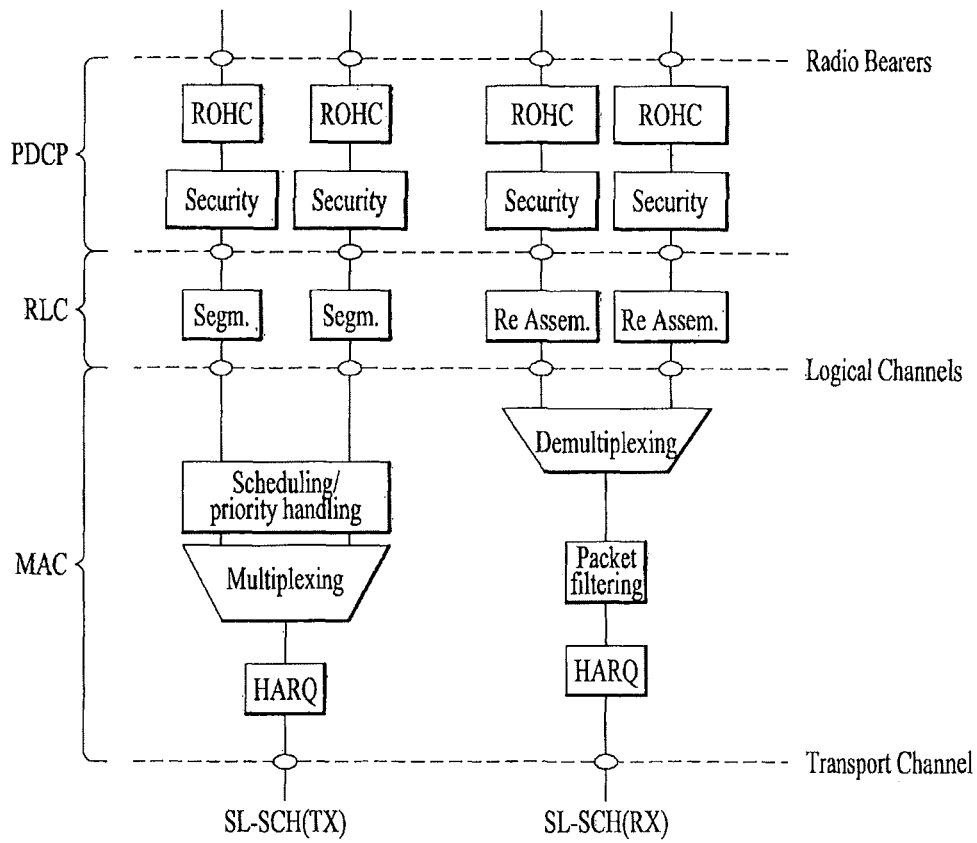
FIG. 10 is a conceptual diagram illustrating for a Layer 2 Structure for Sidelink.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-layer processing: the Sidelink physical layer processing of transport channels differs from UL transmission in the following steps:

i) Scrambling: for PSDCH and PSCCH, the scrambling is not UE-specific;

ii) Modulation: 64 QAM is not supported for Sidelink.

Physical Sidelink control channel: PSCCH is mapped to the Sidelink control resources. PSCCH indicates resource and other transmission parameters used by a UE for PSSCH.

Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical channel procedure: for in-coverage operation, the power spectral density of the sidelink transmissions can be influenced by the eNB.

Figure 11A:
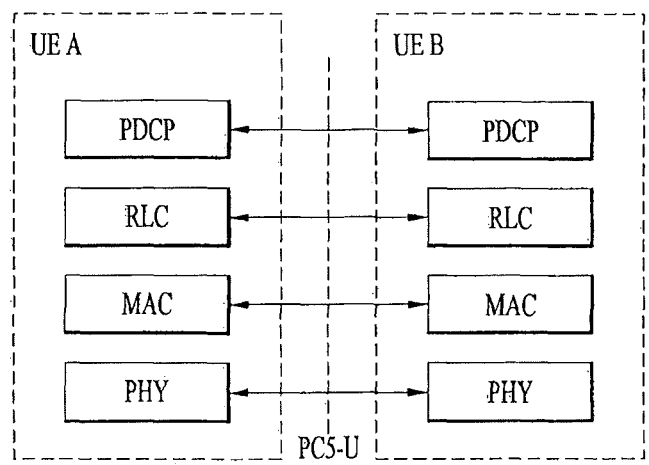
FIG. 11a is a conceptual diagram illustrating for User-Plane protocol stack for ProSe Direct Communication.
Figure 11B:
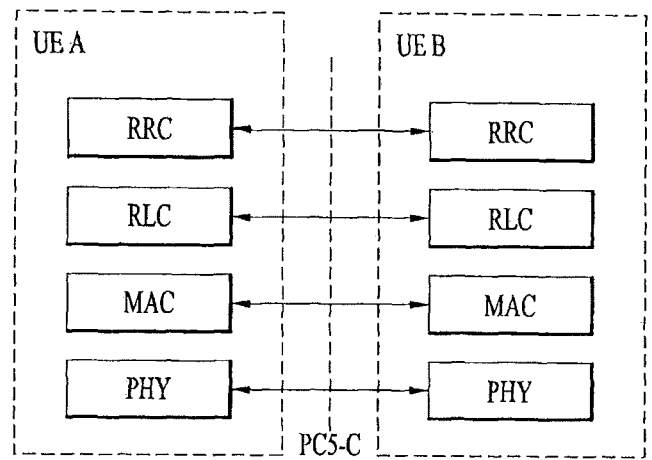
FIG. 11b is Control-Plane protocol stack for ProSe Direct Communication.

FIG. 11a is a conceptual diagram illustrating for User-Plane protocol stack for ProSe Direct Communication, and FIG. 11b is Control-Plane protocol stack for ProSe Direct Communication.

FIG. 11a shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11a.

User plane details of ProSe Direct Communication: i) MAC sub header contains LCIDs (to differentiate multiple logical channels), ii) The MAC header comprises a Source Layer-2 ID and a Destination Layer-2 ID, iii) At MAC Multiplexing/demultiplexing, priority handling and padding are useful for ProSe Direct communication, iv) RLC UM is used for ProSe Direct communication, v) Segmentation and reassembly of RLC SDUs are performed, vi) A receiving UE needs to maintain at least one RLC UM entity per transmitting peer UE, vii) An RLC UM receiver entity does not need to be configured prior to reception of the first RLC UM data unit, and viii) U-Mode is used for header compression in PDCP for ProSe Direct Communication.

FIG. 11b shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a D2D communication.

Figure 12:
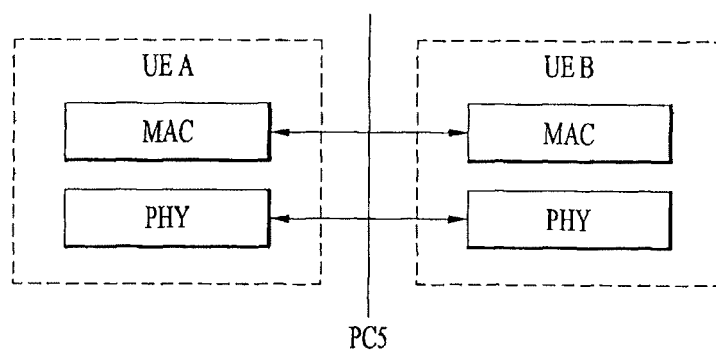
FIG. 12 is a conceptual diagram illustrating for a PC5 interface for ProSe Direct Discovery.

FIG. 12 is a conceptual diagram illustrating for a PC5 interface for ProSe Direct Discovery.

ProSe Direct Discovery is defined as the procedure used by the ProSe-enabled UE to discover other ProSe-enabled UE(s) in its proximity using E-UTRA direct radio signals via PC5.

Radio Protocol Stack (AS) for ProSe Direct Discovery is shown in FIG. 12.

The AS layer performs the following functions:

Interfaces with upper layer (ProSe Protocol): The MAC layer receives the discovery information from the upper layer (ProSe Protocol). The IP layer is not used for transmitting the discovery information.

Scheduling: The MAC layer determines the radio resource to be used for announcing the discovery information received from upper layer.

Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.

Type 1: A resource allocation procedure where resources for announcing of discovery information are allocated on a non UE specific basis, further characterized by: i) The eNB provides the UE(s) with the resource pool configuration used for announcing of discovery information. The configuration may be signalled in SIB, ii) The UE autonomously selects radio resource(s) from the indicated resource pool and announce discovery information, iii) The UE can announce discovery information on a randomly selected discovery resource during each discovery period.

Type 2: A resource allocation procedure where resources for announcing of discovery information are allocated on a per UE specific basis, further characterized by: i) The UE in RRC_CONNECTED may request resource(s) for announcing of discovery information from the eNB via RRC, ii) The eNB assigns resource(s) via RRC, iii) The resources are allocated within the resource pool that is configured in UEs for monitoring.

For UEs in RRC_IDLE, the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED,

A UE authorized to perform ProSe Direct Discovery announcement indicates to the eNB that it wants to perform D2D discovery announcement.

The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource(s) by RRC signaling or b) the UE enters IDLE. (FFS whether resources may remain valid even in IDLE).

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Figure 13:
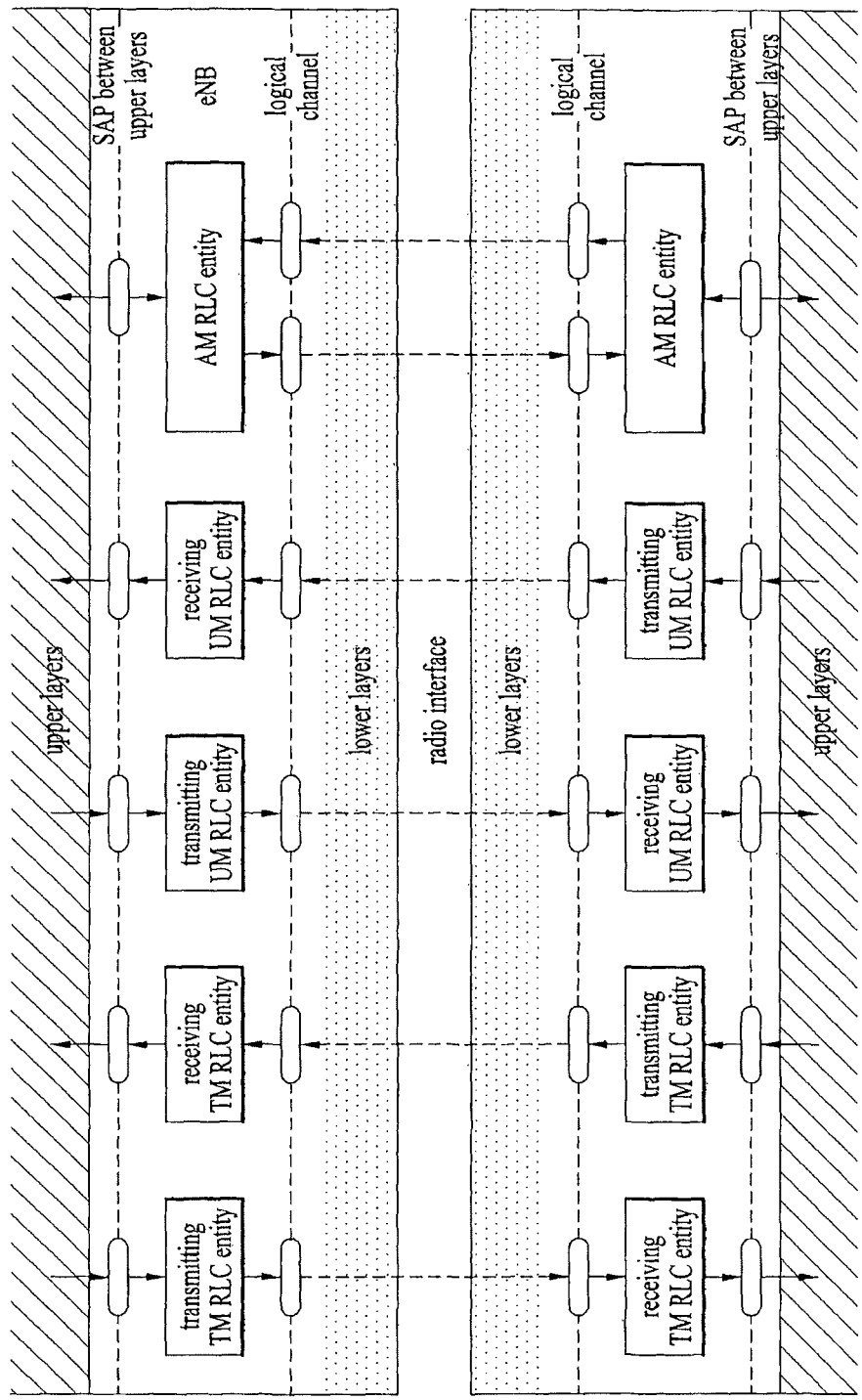
FIG. 13 is a conceptual diagram illustrating for overview model of the RLC sub layer.

FIG. 13 is a conceptual diagram illustrating for overview model of the RLC sub layer.

Functions of the RLC sub layer are performed by RLC entities. For a RLC entity configured at the eNB, there is a peer RLC entity configured at the UE and vice versa. For an RLC entity configured at the transmitting UE for STCH or SBCCH there is a peer RLC entity configured at each receiving UE for STCH or SBCCH.

An RLC entity receives/delivers RLC SDUs from/to upper layer and sends/receives RLC PDUs to/from its peer RLC entity via lower layers. An RLC PDU can either be a RLC data PDU or a RLC control PDU. If an RLC entity receives RLC SDUs from upper layer, it receives them through a single SAP between RLC and upper layer, and after forming RLC data PDUs from the received RLC SDUs, the RLC entity delivers the RLC data PDUs to lower layer through a single logical channel. If an RLC entity receives RLC data PDUs from lower layer, it receives them through a single logical channel, and after forming RLC SDUs from the received RLC data PDUs, the RLC entity delivers the RLC SDUs to upper layer through a single SAP between RLC and upper layer. If an RLC entity delivers/receives RLC control PDUs to/from lower layer, it delivers/receives them through the same logical channel it delivers/receives the RLC data PDUs through.

An RLC entity can be configured to perform data transfer in one of the following three modes: Transparent Mode (TM), Unacknowledged Mode (UM) or Acknowledged Mode (AM). Consequently, an RLC entity is categorized as a TM RLC entity, an UM RLC entity or an AM RLC entity depending on the mode of data transfer that the RLC entity is configured to provide.

A TM RLC entity is configured either as a transmitting TM RLC entity or a receiving TM RLC entity. The transmitting TM RLC entity receives RLC SDUs from upper layer and sends RLC PDUs to its peer receiving TM RLC entity via lower layers. The receiving TM RLC entity delivers RLC SDUs to upper layer and receives RLC PDUs from its peer transmitting TM RLC entity via lower layers.

An UM RLC entity is configured either as a transmitting UM RLC entity or a receiving UM RLC entity. The transmitting UM RLC entity receives RLC SDUs from upper layer and sends RLC PDUs to its peer receiving UM RLC entity via lower layers. The receiving UM RLC entity delivers RLC SDUs to upper layer and receives RLC PDUs from its peer transmitting UM RLC entity via lower layers.

An AM RLC entity consists of a transmitting side and a receiving side. The transmitting side of an AM RLC entity receives RLC SDUs from upper layer and sends RLC PDUs to its peer AM RLC entity via lower layers. The receiving side of an AM RLC entity delivers RLC SDUs to upper layer and receives RLC PDUs from its peer AM RLC entity via lower layers.

The following applies to all RLC entity types (i.e. TM, UM and AM RLC entity): i) RLC SDUs of variable sizes which are byte aligned (i.e. multiple of 8 bits) are supported, and ii) RLC PDUs are formed only when a transmission opportunity has been notified by lower layer (i.e. by MAC) and are then delivered to lower layer.

Figure 14:
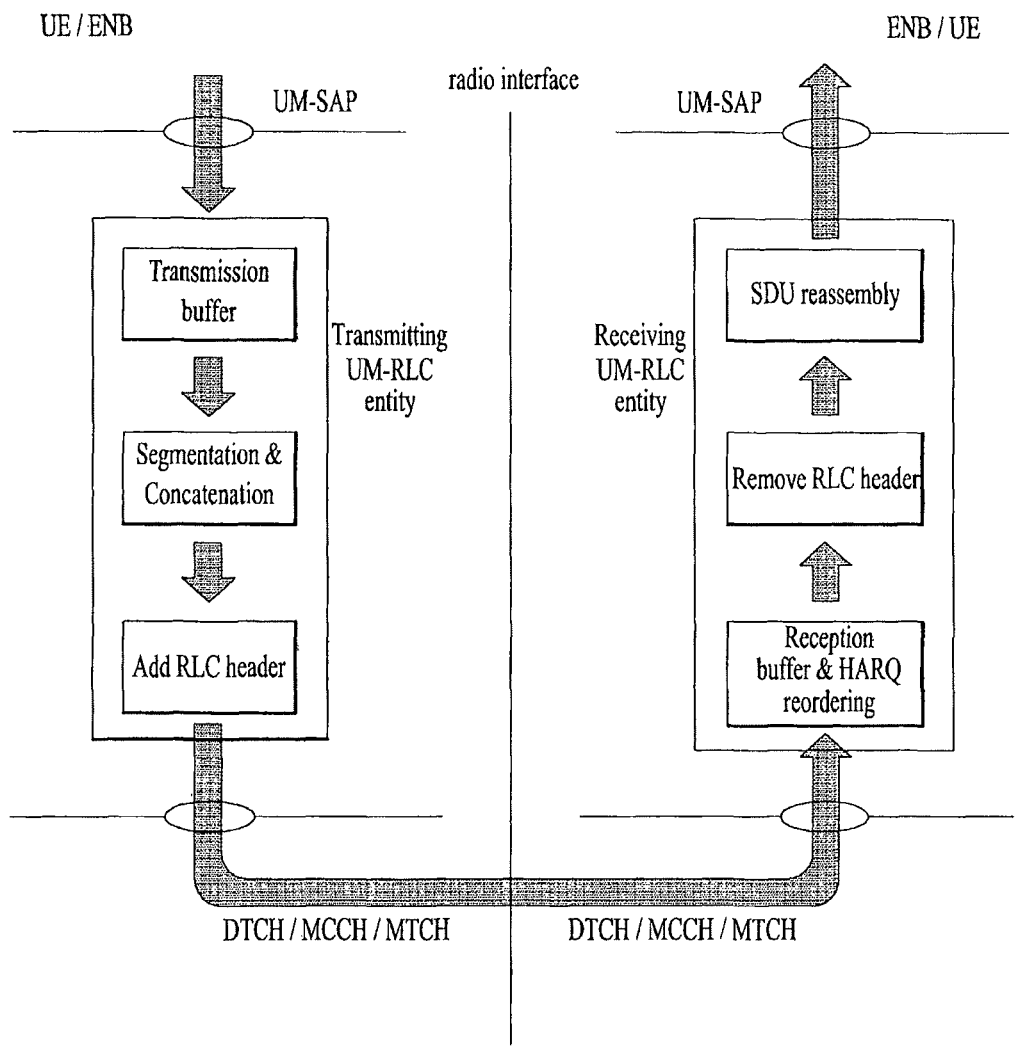
FIG. 14 is a conceptual diagram illustrating for model of two unacknowledged mode peer entities.

FIG. 14 is a conceptual diagram illustrating for model of two unacknowledged mode peer entities.

In UM (Unacknowledged Mode), in-sequence delivery to higher layers is provided, but no retransmissions of missing PDUs are requested. UM is typically used for services such as VoIP where error-free delivery is of less importance compared to short delivery time. TM (Transparent Mode), although supported, is only used for specific purposes such as random access.

Unacknowledged mode (UM) supports segmentation/reassembly and in-sequence delivery, but not retransmissions. This mode is used when error-free delivery is not required, for example voice-over IP, or when retransmissions cannot be requested, for example broadcast transmissions on MTCH and MCCH using MBSFN.

When a transmitting UM RLC entity forms UMD PDUs from RLC SDUs, the transmitting UM RLC entity may i) segment and/or concatenate the RLC SDUs so that the UMD PDUs fit within the total size of RLC PDU(s) indicated by lower layer at the particular transmission opportunity notified by lower layer; and ii) include relevant RLC headers in the UMD PDU.

When a receiving UM RLC entity receives UMD PDUs, the receiving UM RLC entity may i) detect whether or not the UMD PDUs have been received in duplication, and discard duplicated UMD PDUs; ii) reorder the UMD PDUs if they are received out of sequence; iii) detect the loss of UMD PDUs at lower layers and avoid excessive reordering delays; iv) reassemble RLC SDUs from the reordered UMD PDUs (not accounting for RLC PDUs for which losses have been detected) and deliver the RLC SDUs to upper layer in ascending order of the RLC SN; and v) discard received UMD PDUs that cannot be reassembled into a RLC SDU due to loss at lower layers of an UMD PDU which belonged to the particular RLC SDU.

At the time of RLC re-establishment, the receiving UM RLC entity may reassemble RLC SDUs from the UMD PDUs that are received out of sequence and deliver them to upper layer, if possible; ii) discard any remaining UMD PDUs that could not be reassembled into RLC SDUs; and iii) initialize relevant state variables and stop relevant timers.

Figure 15:
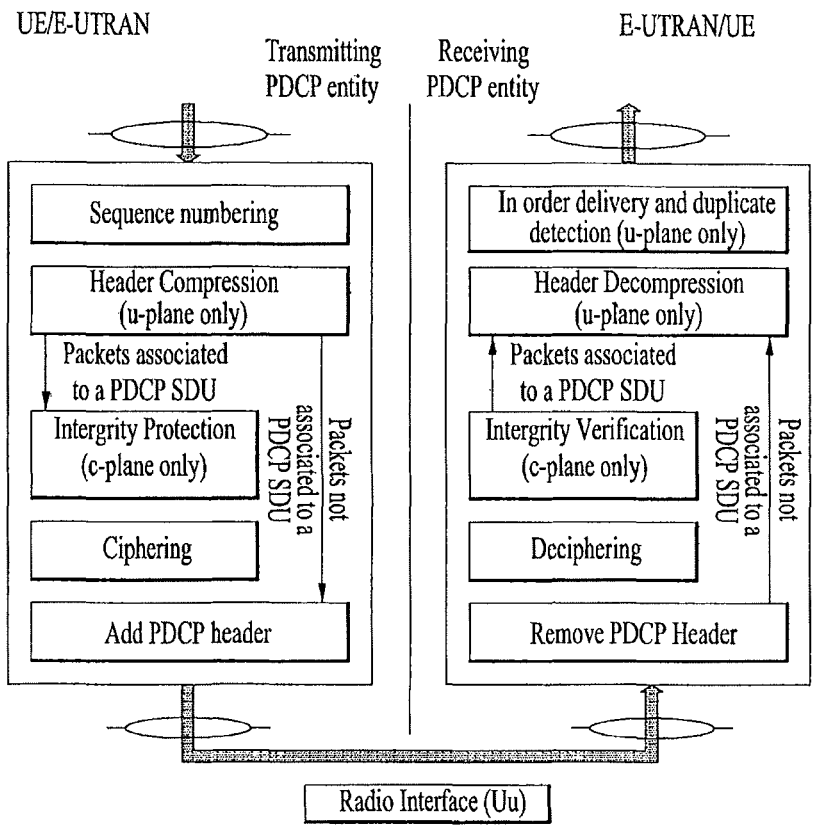
FIG. 15 is a conceptual diagram for functional view of a PDCP entity.

FIG. 15 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 15 represents the functional view of the PDCP entity for the PDCP sublayer, it should not restrict implementation. For RNs, integrity protection and verification are also performed for the u-plane.

UL Data Transfer Procedures:

At reception of a PDCP SDU from upper layers, the UE may start a discard timer associated with the PDCP SDU. For a PDCP SDU received from upper layers, the UE may associate a PDCP SN (Sequence Number) corresponding to Next_PDCP_TX_SN to the PDCP SDU, perform header compression of the PDCP SDU, perform integrity protection and ciphering using COUNT based on TX_HFN and the PDCP SN associated with this PDCP SDU, increment the Next_PDCP_TX_SN by one, and submit the resulting PDCP Data PDU to lower layer.

If the Next_PDCP_TX_SN is greater than Maximum_PDCP_SN, the Next_PDCP_TX_SN is set to '0' and TX_HFN is incremented by one.

DL Data Transfer Procedures:

For DRBs mapped on RLC UM, at reception of a PDCP Data PDU from lower layers, if received PDCP SN<Next_PDCP_RX_SN, the UE may increment RX_HFN by one, and decipher the PDCP Data PDU using COUNT based on RX_HFN and the received PDCP SN. And the UE may set Next_PDCP_RX_SN to the received PDCP SN+1.

If Next_PDCP_RX_SN>Maximum_PDCP_SN, the UE may set Next_PDCP_RX_SN to 0, and increment RX_HFN by one.

The UE may perform header decompression (if configured) of the deciphered PDCP Data PDU, and deliver the resulting PDCP SDU to upper layer.

Figure 16:
FIG. 16 is a conceptual diagram for transmitting a RadioResourceConfigDedicated from E-UTRAN to a UE.

FIG. 16 is a conceptual diagram for transmitting a RadioResourceConfigDedicated from E-UTRAN to a UE.

The UE may establish a PDCP entity and configure it with the current security configuration and in accordance with the received pdcp-Config and establish an RLC entity or entities in accordance with the received rlc-Config, for each drb-Identity value included in the drb-ToAddModList that is not part of the current UE configuration.

The IE RadioResourceConfigDedicated is used to setup/modify/release RBs, to modify the MAC main configuration, to modify the SPS configuration and to modify dedicated physical configuration.

The IE RadioResourceConfigDedicated includes the drb-ToAddModList including pdcp-Config and rlc-Config, such as following Table 1.

TABLE 1

| RadioResourceConfigDedicated information element |
| --- |
| ```
-- ASN1START
RadioResourceConfigDedicated ::=    SEQUENCE {
    srb-ToAddModList                    SRB-ToAddModList            OPTIONAL,   -- Cond HO-Conn
    drb-ToAddModList                    DRB-ToAddModList            OPTIONAL,   -- Cond HO-
    ....
SRB-ToAddModList ::=                SEQUENCE (SIZE (1..2)) OF SRB-ToAddMod
SRB-ToAddMod ::= SEQUENCE {
    srb-Identity                        INTEGER (1..2),                         -- Cond Setup
    rlc-Config                          CHOICE {
        explicitValue                       RLC-Config,
        defaultValue                        NULL
    }                               OPTIONAL
    logicalChannelConfigOPTIONAL,   CHOICE {                                    -- Cond Setup
        explicitValue                       LogicalChannelConfig,
        defaultValue                        NULL
    }                               OPTIONAL
    ...
}
DRB-ToAddModList ::=                SEQUENCE (SIZE (1..maxDRB)) OF DRB-ToAddMod
DRB-ToAddMod = SEQUENCE {
    eps-Bearer Identity                 INTEGER (0..15)             OPTIONAL,   -- Cond DRB-Setup
    drb-Identity                        DRB-Identity,
    pdcp-Config                         PDCP-Config                 OPTIONAL,   -- Cond DRB-Setup
    rlc-Config                          RLC-Config                  OPTIONAL,   -- Cond Setup
    logical Channel Identity            INTEGER (3..10)             OPTIONAL,   -- Cond DRB-Setup
    logical ChannelConfig               Logical Channel Config      OPTIONAL,   -- Cond Setup
    ....
}
``` |

The IE RLC-Config is used to specify the RLC configuration of SRBs and DRBs.

For SRBs a choice is used to indicate whether the RLC configuration is signaled explicitly or set to the values defined in the default RLC configuration for SRB1 or for SRB2. RLC AM is the only applicable RLC mode for SRB1 and SRB2. E-UTRAN does not reconfigure the RLC mode of DRBs except when a full configuration option is used, and may reconfigure the UM RLC SN field size only upon handover within E-UTRA or upon the first reconfiguration after RRC connection re-establishment.

The RLC-Config includes parameters of SN-FieldLength and T-Reordering, and so on.

The SN-FieldLength Indicates the UM RLC SN field size in bits. Value size5 means 5 bits, size10 means 10 bits.

The T-Reordering is a timer for reordering in milliseconds. Value ms0 means 0 ms, ms5 means 5 ms and so on

TABLE 2

| RLC-config information element |
| --- |
| ```
-- ASN1START
RLC-Config ::=          CHOICE {                                    SEQUENCE {
    am
        ul-AM-RLC                                                       UL-AM-RLC
        dl-AM-RLC                                                       DL-AM-RLC
    },
    um-Bi-Directional                           SEQUENCE {
        ul-UM-RLC                                                       UL-UM-RLC
``` |

TABLE 2-continued

| RLC-config information element | | |
|---|---|---|
| dl-UM-RLC | | DL-UM-RLC |
| }, | | |
| um-Uni-Directional-UL | SEQUENCE { | |
| ul-UM-RLC | | UL-UM-RLC |
| }, | | |
| um-Uni-Directional-UL | SEQUENCE { | |
| dl-UM-RLC | | DL-UM-RLC |
| }, | | |
| ... | | |
| SN-FieldLength : := | ENUMERATED {size5, size10} | |
| T-Pol IRetransmit : := | ENUMERATED { | ms5, ms10, ms15, ms20, ms 25, ms30, ms35, ms40, ms45, ms50, ms55, ms00, ms65, ms70, ms75, ms80, ms85, ms90, ms95, ms100, ms105, ms110, ms115, ms120, ms125, ms130, ms135, ms140, ms145, ms150, ms155, ms150, ms155, ms170, ms175, ms180, ms185, ms190, ms195, ms200, ms205, ms210, ms215, ms220, ms225 ms230, ms235, ms240, ms245, ms250, ms350, ms400, ms450, ms500, spare9, spare8, spare7, spare6, spare5, spare4, spare3, spare2, spare1} |
| Pol I PDU : := | ENUMERATED { | P4, p8, P16, p32, p64, p128, p256, pInfinity} |
| Pol I Byte : := | ENUMERATED { | kB25, kB50, kB75, kB100, kB125, kB250, kB375, kB500, kB750, kB1000, kB1250, kB1500, kB2000, kB3000, kBinfinity, spareI} |
| T-Reordering : := | ENUMERATED { | ms0, ms5, ms10, ms15, ms20, ms25, ms30, ms35, ms40, ms45, ms 50, ms 55, ms80, ms65, ms 70, ms 75, ms80, 5505, ms90, ms95, ms100, ms110, ms120, ms130, ms140, ms150, ms160, ms170, ms180, ms190, ms200, spare1} |

The IE PDCP-Config is used to set the configurable PDCP parameters for data radio bearers.

The PDCP-Config includes parameters of pdcp-SN-size and headerCompression.

The pdcp-SN-size indicates the PDCP Sequence Number length in bits. For RLC UM: value len7bits means that the 7-bit PDCP SN format is used and len12bits means that the 12-bit PDCP SN format is used. For RLC AM: value len15bits means that the 15-bit PDCP SN format is used, otherwise if the field is not included upon setup of the PCDP entity 12-bit PDCP SN format is used

| PDCP-config information element | | | |
|---|---|---|---|
| -- ASN1START | | | |
| PDCP-Config ::= | SEQUENCE { | | |
|     discardTimer | ENUMERATED { | | |
| |     ms50, ms100, ms150, | | |
| |     ms300, ms500, ms750, | | |
| |     ms1500, Infinity | | |
| | } | OPTIONAL, | -- Cond Setup |
|     rlc-AM | SEQUENCE { | | |
|         statusReportRequired | BOOLEAN | | |
| | } | OPTIONAL, | -- Cond Rlc-AM |
|     rlc-UM | SEQUENCE { | | |
|         pdcp-SN-Size | ENUMERATED {len7bits, len12bits} | | |
| | } | OPTIONAL, | -- Cond Rlc-UM |
|     headerCompression | CHOICE { | | |
|         notUsed | NULL, | | |
|         rohc | SEQUENCE { | | |
|             maxCID | INTEGER (1..16383) | DEFAULT 15, | |
|             profiles | SEQUENCE { | | |
|                 profile0x0001 | BOOLEAN, | | |
|                 profile0x0002 | BOOLEAN, | | |
|                 profile0x0003 | BOOLEAN, | | |
|                 profile0x0004 | BOOLEAN, | | |
|                 profile0x0006 | BOOLEAN, | | |
|                 profile0x0101 | BOOLEAN, | | |
|                 profile0x0102 | BOOLEAN, | | |
|                 profile0x0103 | BOOLEAN, | | |
|                 profile0x0104 | BOOLEAN, | | |
|     }, | ENUMERATED {enabled} OPTIONAL -- Cond RN | | |
|     ... | ENUMERATED i{en15bits} OPTIONAL -- Cond Rlc-AM2 | | |
|     } | BOOLEAN | OPTIONAL, -- Need ON | |
| }, | ENUMERATED { | | |
| ..., |     ms0, ms20, ms40, ms60, ms80, ms100, ms120, ms140, | | |
| [[   rn-IntegrityProtection-r10 |     ms160, ms180, ms200, ms220, ms240, ms260, ms280, | | |
| ]], |     ms300, ms500, ms750, sparel4, sparel3, sparel2, sparel1, | | |
| [[   pdcp-SN-Size-v1130 |     spare10, spare9, spare8, spare7, spare6, spare5, spare4, | | |
| ]], |     spare3, spare2, spare1} | | |

| PDCP-config information element |
|---|
| [[ ul-DataSplitDRB-ViaSCG-r12t-Reordering-r12    OPTIONAL    -- Cond SetupS<br>]]<br>}<br>-- ASN1STOP |

The maxCID indicates the value of the MAX_CID parameter. The total value of MAX_CIDs across all bearers for the UE should be less than or equal to the value of maxNumberROHC-ContextSessions parameter as indicated by the UE, and the profiles used by both compressor and decompressor in both UE and E-UTRAN. The field indicates which of the ROHC profiles are supported, i.e. value true indicates that the profile is supported. Profile 0x0000 shall always be supported when the use of ROHC is configured. If support of two ROHC profile identifiers with the same 8 LSB's is signaled, only the profile corresponding to the highest value shall be applied.

In the legacy system, a UE establishes L2 entities such as a PDCP entity and an RLC entity in accordance with the RRC message (i.e., rlc-Config and pdcp-Config) when a radio bearer is added by an eNB. The RRC message for L2 entity configuration includes parameters and timer information according to its mode (AM, UM, TM).

In D2D communication, RLC UM mode is only applicable for D2D radio bearer. The receiving UE (rxUE) maintains at least one RLC entity per transmitting UE (txUE). However, the RLC entity in UE-RX does not need to be configured prior to reception of the first RLC UM data unit. The motivation is not to maintain a L2 entity (RLC or PDCP entities) unless there is D2D communication. Accordingly, the L2 entity will be established upon receiving the very first D2D data and released when there is no D2D communication.

In order to establish L2 entities, a UE should have proper configuration information to be applied to each RLC and PDCP entity. Given that D2D communication is performed using PC5 interface between txUE and rxUE, the conventional mechanism that eNB provides L2 entity configuration information to the rxUE cannot be applied to D2D communication.

Figure 17:
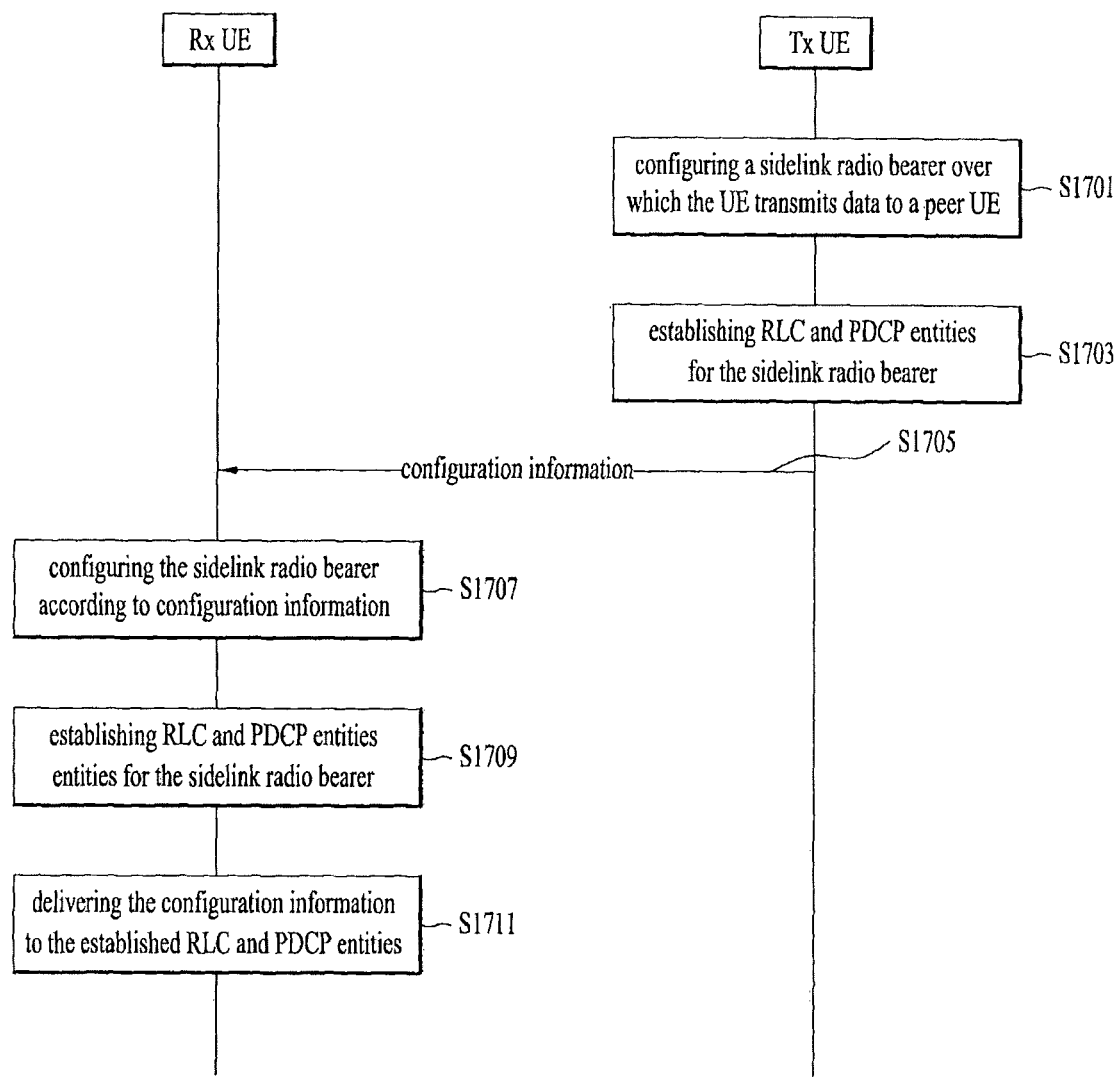
FIGS. 17-19 are conceptual diagrams for establishing layer-2 entities for D2D communication according to embodiments of the present invention.

FIG. 17 is a conceptual diagram for establishing layer-2 entities for D2D communication according to embodiments of the present invention.

In D2D communication, for the receiving UE (rxUE) to establish layer-2 entities such as PDCP entity and RLC entity for a sidelink radio bearer, it is invented that the txUE transmits layer2 entity configuration information (D2D-L2ConfigInfo) to the rxUE at D2D radio bearer setup, and rxUE establishes layer2 entities for the D2D radio bearer based on the D2D-L2ConfigInfo received from the txUE.

When a transmitting UE configures a sidelink radio bearer over which the transmitting UE transmits data to a receiving UE (S1701), the transmitting UE establishes RLC and PDCP entities for the sidelink radio bearer by setting PDCP-SN-Size, headerCompression, SN-FieldLength, and T-Reordering by taking QoS of the sidelink into account (S1703).

The transmitting UE transmits configuration information of the sidelink radio bearer via a sidelink to the receiving UE (S1705).

Preferably, the transmitting UE is directly connected to the receiving UE via the sidelink.

Preferably, the configuration information is transmitted via a first D2D packet, wherein the first D2D packet is transmitted before transmitting any other D2D packets of the sidelink radio bearer to the receiving UE.

Preferably, the first D2D packet further includes at least one of a target ID, a source ID or LCID. The receiving UE is identified by targetID, the transmitting UE is identified by sourceID, and a logical channel of the sidelink radio bearer is identified by the LCID.

Preferably, the configuration information includes at least one of the following: PDCP-SN-Size, a headerCompression, or a SN-FieldLength and T-Reordering. Especially, the T-Reordering is a parameter used for an RLC entity for the receiving UE.

Preferably, the configuration information is transmitted one or multiple times to the peer UE, wherein the transmission number of configuration information is configured by the network or pre-defined.

Preferably, the configuration information is transmitted periodically to the peer UE, wherein periodicity of transmitting configuration information is configured by the network or pre-defined.

Preferably, the configuration information is transmitted as form of at least one of RRC (Radio Resource Control), PDCP (Packet Data Convergence Protocol), RLC (Radio Link Control), MAC (Medium Access Control), or PHY (PHYsical) signal.

When the receiving UE receives the configuration information of the sidelink radio bearer via a sidelink from the transmitting UE (S1705), the receiving UE configures the sidelink radio bearer according to the configuration information (S1707) and establishes RLC and PDCP entities for the sidelink radio bearer if the RLC and PDCP entities are not established yet (S1709).

The receiving UE establishes the PDCP entity and the RLC entity for the sidelink radio bearer associated with the received targetID, sourceID, and LCID by setting PDCP-SN-Size, headerCompression, SN-FieldLength, and T-Reordering to the values received in the configuration information.

After the step of S1709, the receiving UE the configuration information to the established RLC and PDCP entities (S1711).

If the RLC and PDCP entities are already established for the sidelink radio bearer associated with the received the target ID, source ID and LCID, the receiving UE can ignore the received configuration information, or the receiving UE can update the RLC and PDCP entities for the sidelink associated with a targetID, a sourceID, and a LCID by setting the PDCP-SN-Size, the headerCompression, the SN-FieldLength, and the T-Reordering to the values received in the configuration information.

Figure 18:
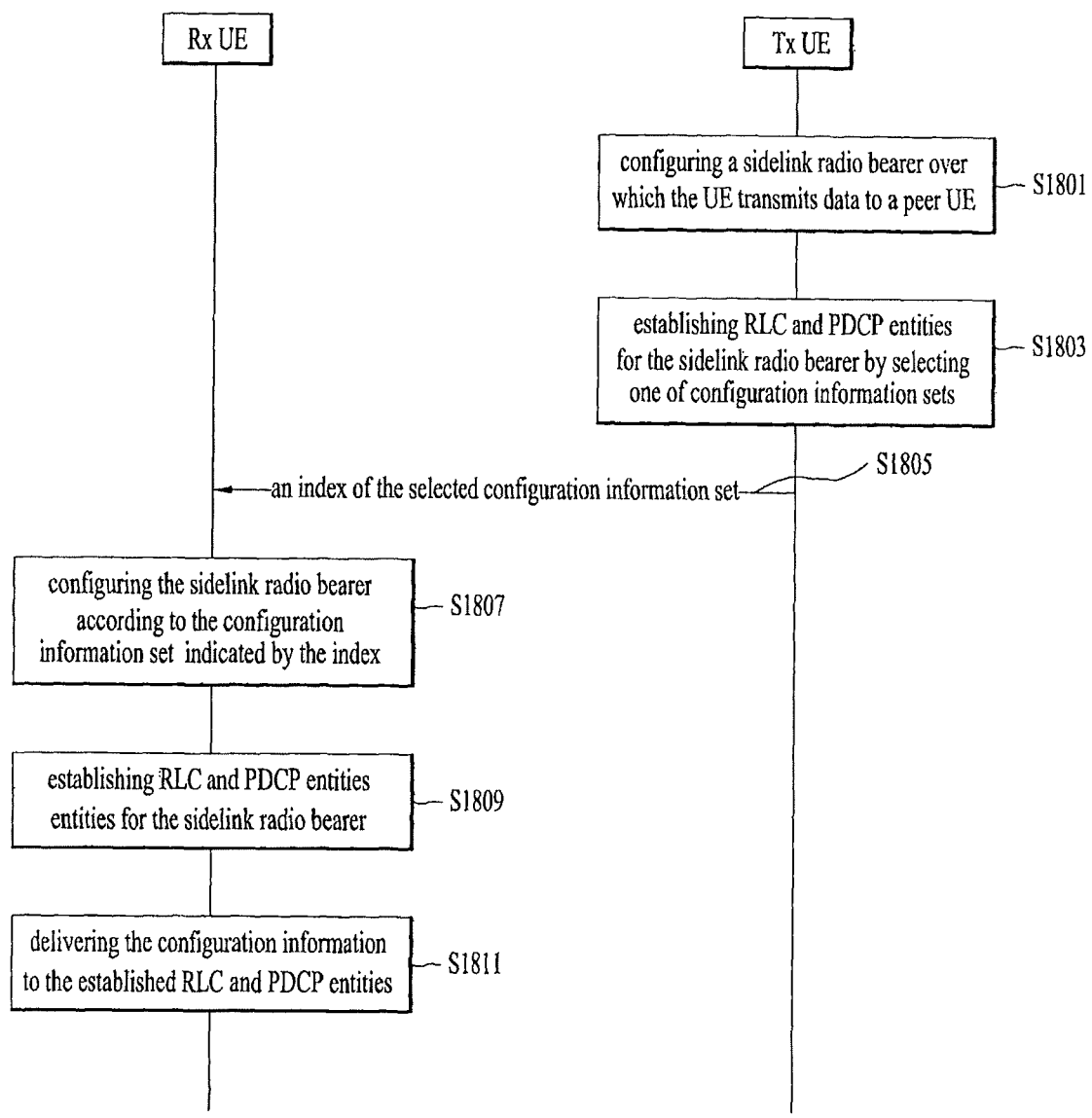

FIG. 18 is a conceptual diagram for establishing layer-2 entities for D2D communication according to embodiments of the present invention.

When a transmitting UE configures a sidelink radio bearer over which the transmitting UE transmits data to a receiving UE (S1801), the transmitting UE establishes RLC and PDCP entities for the sidelink radio bearer for the sidelink radio bearer by selecting one of configuration information sets (S1803).

Preferably, the configuration information sets are pre-defined for the sidelink radio bearer.

Preferably, the configuration information set includes at least one of parameters including a PDCP-SN-Size, a headerCompression, a SN-FieldLength and a T-Reordering.

For example, D2D-L2ConfigInfo set #1 is [PDCP-SN-Size=5 bit, headerCompression=ON, SN-FieldLength=7 bit, T-Reordering=10 ms]; and D2D-L2ConfigInfo set #2 is [PDCP-SN-Size=5 bit, headerCompression=OFF, SN-FieldLength=7 bit, T-Reordering=30 ms].

Thus, the transmitting UE sets PDCP-SN-Size, headerCompression, SN-FieldLength, and T-Reordering for the sidelink radio bearer to the values of the selected configuration information set.

Preferably, each configuration information set is identified by each configuration information index. The configuration information index can be associated with an ID (e.g., LCID). The LCID is an identifier of a logical channel of the sidelink radio bearer.

One configuration information index may indicate one configuration information set. And multiple configuration information indices can be associated with one configuration information set. For example, configuration information indices 1~10 is associated with D2D-L2ConfigInfo set #1, configuration information indices 11~20 is associated with D2D-L2ConfigInfo set #2.

Preferably, the transmitting UE can configure mapping relation between configuration information sets and indices and transmit the mapping relation to the receiving UE. Alternatively, the transmitting UE can receive mapping relation between configuration information sets and indices from a network. Accordingly, the transmitting UE and the receiving UE acquire same information on the mapping relation between configuration information sets and indices.

The transmitting UE transmits the first D2D packet of the sidelink radio bearer including at least one of the followings: i) an index of the selected configuration information set ii) a targetID identifying the receiving UE, and iii) a sourceID identifying the transmitting UE, and iv) a LCID identifying a logical channel of the sidelink radio bearer (S1805).

Preferably, the first D2D packet is transmitted via a sidelink to the peer UE, wherein the UE is directly connected to the peer UE via the sidelink.

Preferably, the first D2D packet is transmitted before transmitting any other D2D packets of the sidelink radio bearer to the receiving UE.

Preferably, the LCID can be used for the index of the selected configuration information set. In this case, if LCID is used for the index of the selected configuration information set, the first D2D packet may not include the index of the selected configuration information set.

Preferably, the index of the selected configuration information set is transmitted one or multiple times to the peer UE, wherein the transmission number of the index is configured by the network or pre-defined.

Preferably, the index of the selected configuration information set is transmitted periodically to the peer UE, wherein periodicity of transmitting the index is configured by the network or pre-defined.

Preferably, the index of the selected configuration information set is transmitted as form of at least one of RRC (Radio Resource Control), PDCP (Packet Data Convergence Protocol), RLC (Radio Link Control), MAC (Medium Access Control), or PHY (PHYsical layer) signal.

When the receiving UE receives the index of a sidelink radio bearer via a sidelink from the transmitting UE (S1805), the receiving UE configures the sidelink radio bearer according to the configuration information set indicated by the index (S1807).

Preferably, the index can be received via the first D2D packet including the target ID, the sourceID and the LCID. If a PDCP entity and a RLC entity are not established yet for the sidelink radio bearer associated with the received targetID, sourceID, and LCID, the receiving UE setups the sidelink radio bearer associated with the received targetID, sourceID, and LCID (S1809). I.e., the receiving UE establishes the PDCP entity and the RLC entity for the sidelink radio bearer associated with the received targetID, sourceID, and LCID by setting PDCP-SN-Size, headerCompression, SN-FieldLength, and T-Reordering to the values in configuration information set indicated by the index.

And the receiving UE delivers the first D2D packet including the index to the established RLC and PDCP entities (S1811).

If PDCP entity and RLC entity are already established for the sidelink radio bearer associated with the received targetID, sourceID, and LCID, the receiving UE does not change the layer2 configuration parameters for the PDCP entity and the RLC entity associated with the index of the received D2D packet.

Alternately, if PDCP entity and RLC entity are already established for the sidelink radio bearer associated with the received targetID, sourceID, and LCID, the receiving UE updates the PDCP entity and the RLC entity for the sidelink radio bearer associated with the received targetID, sourceID, and LCID by setting PDCP-SN-Size, headerCompression, SN-FieldLength, and T-Reordering to the values in configuration information set indicated by the ID. And then, the receiving UE delivers the first D2D packet including the index to the established RLC and PDCP entities associated with [targetID, sourceID, LCID].

Figure 19:
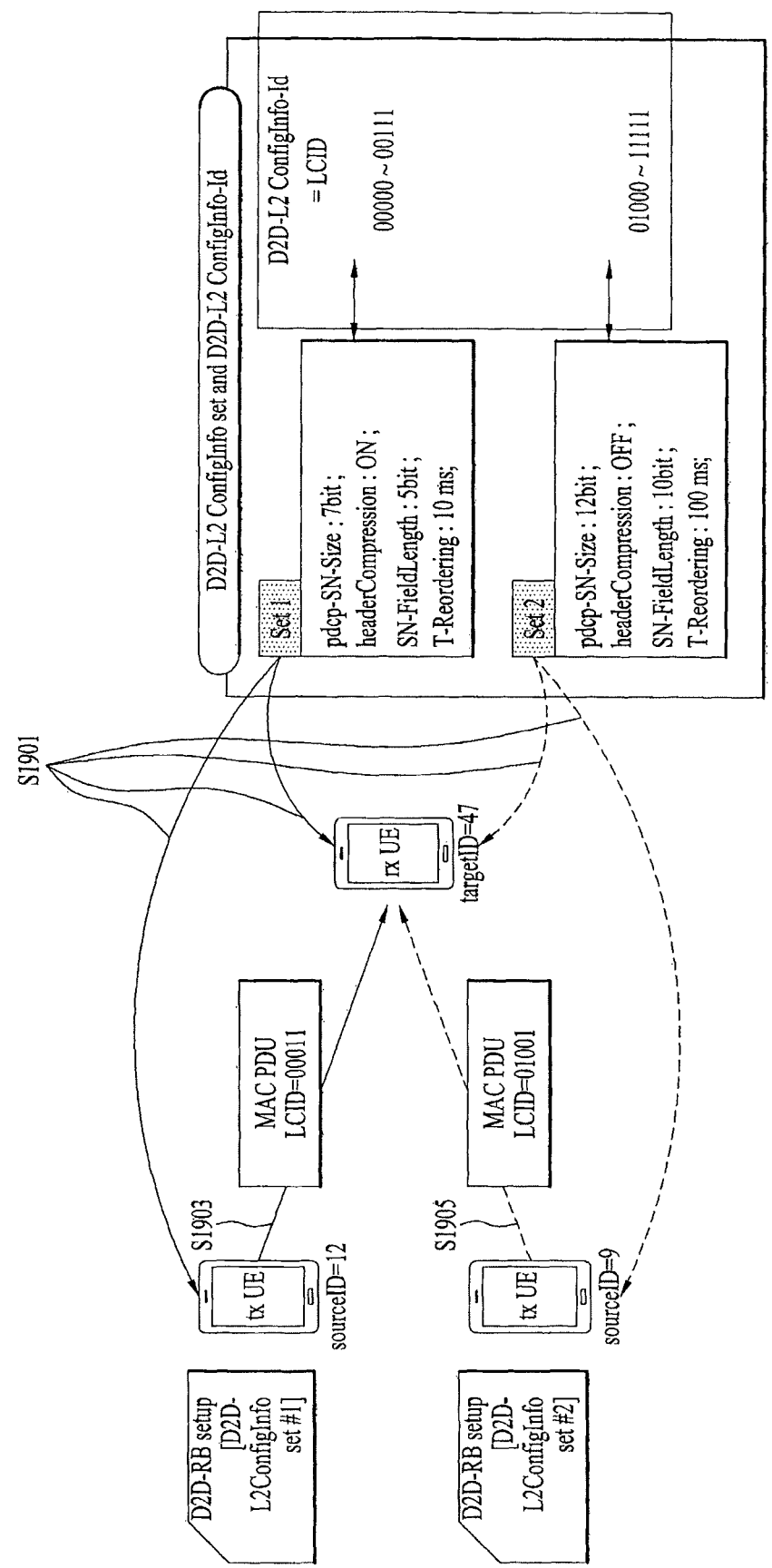

FIG. 19 is an exemplary diagram for establishing layer-2 entities for D2D communication according to embodiments of the present invention.

The network informs the txUE and the rxUE of information on D2D-L2ConfigInfo set and associated LCIDs (S1901).

The txUE with sourceID=12 setups SIDELINK RADIO BEARER #1 using D2D-L2ConfigInfo set #1. For that SIDELINK RADIO BEARER #1, the txUE selects LCID=00011 as a D2D-L2ConfigInfo-Id. The txUE with sourceID=9 setups SIDELINK RADIO BEARER #2 using D2D-L2ConfigInfo set #2. For that SIDELINK RADIO BEARER #2, the txUE selects LCID=01001 as a D2D-L2ConfigInfo-Id.

The txUE with sourceID=12 transmits the D2D packet of that SIDELINK RADIO BEARER #1 to the rxUE by including LCID=00011 in the D2D packet, e.g., MAC PDU (S1903).

When the rxUE receives a D2D packet of SIDELINK RADIO BEARER #1, the rxUE checks whether PDCP and RLC entities are already established for the SIDELINK RADIO BEARER associated with [targetID=47, sourceID=12, LCID=00011]. If there is no PDCP and RLC entities for the SIDELINK RADIO BEARER associated with [targetID=47, sourceID=12, LCID=00011], the rxUE establishes PDCP and RLC entities by setting the layer2 entity configuration parameters to the values of D2D-L2ConfigInfo set indicated by the LCID. In this example, since LCID=00011 indicates D2D-L2ConfigInfo set #1, the UE establishes the PDCP entity and the RLC entity for that SIDELINK RADIO BEARER #1 by setting PDCP-SN-Size=7 bit, headerCompression=ON, SN-FieldLength=5 bit, and T-Reordering=10 ms.

The rxUE delivers the D2D packet of SIDELINK RADIO BEARER #1 to the RLC and PDCP entity associated with [targetID=47, sourceID=12, LCID=00011].

The txUE with sourceID=9 transmits the D2D packet of that SIDELINK RADIO BEARER #2 to the rxUE by including LCID=01001 in the D2D packet, e.g., MAC PDU (S1905).

When the rxUE receives a D2D packet of SIDELINK RADIO BEARER #2, the rxUE checks whether PDCP and RLC entities are already established for the SIDELINK RADIO BEARER associated with [targetID=47, sourceID=9, LCID=01001]. If there is no PDCP and RLC entities for the SIDELINK RADIO BEARER associated with [targetID=47, sourceID=9, LCID=01001], the rxUE establishes PDCP and RLC entities by setting the layer2 entity configuration parameters to the values of D2D-L2ConfigInfo set indicated by the LCID. In this example, since LCID=01001 indicates D2D-L2ConfigInfo set #2, the UE establishes the PDCP entity and the RLC entity for that SIDELINK RADIO BEARER #2 by setting PDCP-SN-Size=12 bit, headerCompression=OFF, SN-FieldLength=10 bit, and T-Reordering=100 ms.

The rxUE delivers the D2D packet of SIDELINK RADIO BEARER #2 to the RLC and PDCP entity associated with [targetID=47, sourceID=9, LCID=01001].

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
    receiving a configuration information index of a configuration information set via a sidelink from the peer UE, wherein the UE is directly connected to the peer UE via the sidelink and, wherein the configuration information set corresponds to a sidelink radio bearer to be configured;
    configuring the sidelink radio bearer according to the configuration information set indicated by the configuration information index;
    establishing Radio Link Control (RLC) and Packet Data Convergence Protocol (PDCP) entities for the sidelink radio bearer based on the configuration information index of the configuration information set, wherein the configuration information set includes at least one parameter including a PDCP-SN-Size, a headerCompression, a SN-FieldLength and a T-Reordering; and
    updating the RLC and PDCP entities for the sidelink radio bearer, when values of the PDCP-SN-Size, the headerCompression, the SN-FieldLength, and the T-Reordering are set to values in the configuration information set indicated by the configuration information index.

2. The method according to claim 1, further comprising:
    receiving, by the UE, a mapping relation between a number of configuration information sets and a number of configuration information indices from the peer UE or a network.

3. The method according to claim 1,
    wherein a logical channel identifier (LCID) is used for the configuration information index, and
    wherein the LCID is an identifier of a logical channel of the sidelink radio bearer.

4. The method according to claim 1, wherein one or more LCIDs are associated with one configuration information set.

5. The method according to claim 1,
wherein the configuration information index of the configuration information set is received via a first Device to Device (D2D) packet, and
wherein the first D2D packet is received before receiving any other D2D packets of the sidelink radio bearer from the peer UE.

6. The method according to claim 5, wherein the first D2D packet further includes at least one of a target identifier (ID), a source ID or a logical channel identifier (LCID).

7. The method according to claim 1, further comprising:
delivering the configuration information index of the configuration information set to the established RLC and PDCP entities.

8. The method according to claim 1, further comprising:
ignoring the received configuration information index of the configuration information set when the RLC and PDCP entities are already established.

9. A user equipment (UE) operating in a wireless communication system, the UE comprising:
a transmitter;
a receiver; and
a processor operably coupled with the transmitter and the receiver and configured to:
control the receiver to receive a configuration information index of a configuration information set via a sidelink from the peer UE, wherein the UE is directly connected to the peer UE via the sidelink and, wherein the configuration information set corresponds to a sidelink radio bearer to be configured,
configure the sidelink radio bearer according to the configuration information set indicated by the configuration information index,
establish Radio Link Control (RLC) and Packet Data Convergence Protocol (PDCP) entities for the sidelink radio bearer based on the configuration information index of the configuration information set, wherein the configuration information set includes at least one parameter including a PDCP-SN-Size, a headerCompression, a SN-FieldLength and a T-Reordering, and
update the RLC and PDCP entities for the sidelink radio bearer, when values of the PDCP-SN-Size, the headerCompression, the SN-FieldLength, and the T-Reordering are set to values in the configuration information set indicated by the configuration information index.

* * * * *